United States Patent
Mennella et al.

(10) Patent No.: US 11,718,751 B2
(45) Date of Patent: Aug. 8, 2023

(54) WATER-BORNE POLYMER COMPOSITION

(71) Applicant: SOLVAY SPECIALTY POLYMERS ITALY S.p.A., Bollate (IT)

(72) Inventors: Amelia Mennella, Torre del Greco (IT); Eric Fassiau, Perwez (BE); Liliana Deninno, Limido Comasco (IT)

(73) Assignee: SOLVAY SPECIALTY POLYMERS ITALY S.P.A., Bóllate (IT)

( * ) Notice: Subject to any disclaimer, the term of this patent is extended or adjusted under 35 U.S.C. 154(b) by 344 days.

(21) Appl. No.: 16/762,148

(22) PCT Filed: Nov. 13, 2018

(86) PCT No.: PCT/EP2018/081109
§ 371 (c)(1),
(2) Date: May 7, 2020

(87) PCT Pub. No.: WO2019/096799
PCT Pub. Date: May 23, 2019

(65) Prior Publication Data
US 2020/0362164 A1      Nov. 19, 2020

(30) Foreign Application Priority Data

Nov. 14, 2017   (EP) ..................................... 17201498

(51) Int. Cl.
*C08L 71/00* (2006.01)
*C09D 171/00* (2006.01)

(52) U.S. Cl.
CPC ............. *C08L 71/00* (2013.01); *C09D 171/00* (2013.01)

(58) Field of Classification Search
CPC .......... C08L 71/00; C08L 71/02; C08L 71/08; C08L 71/10; C09D 171/00; C09D 171/02; C09D 171/08; C09D 171/10
See application file for complete search history.

(56) References Cited

U.S. PATENT DOCUMENTS

| | | | |
|---|---|---|---|
| 2005/0070659 A1 | 3/2005 | Shiow-Ling et al. |
| 2017/0002209 A1 | 1/2017 | Gantillon et al. |

FOREIGN PATENT DOCUMENTS

| | | |
|---|---|---|
| EP | 367884 A1 | 5/1990 |
| FR | 2969635 A1 | 6/2012 |
| WO | 2005012423 A1 | 2/2005 |
| WO | 2015092262 A1 | 6/2015 |

OTHER PUBLICATIONS

Larsson M. et al., "Suspension Stability Why Particle Size, Zeta Potential and Rheology are important.", Annual Transactions of the Nordic Rheology Society, 2012, vol. 20, pp. 209-214, XP002777947.

*Primary Examiner* — Zachary M Davis
(74) *Attorney, Agent, or Firm* — Osha Bergman Watanabe & Burton LLP

(57) ABSTRACT

This invention pertains to a water-borne polyaryletherketone composition which possesses outstanding shelf stability and which, when coated onto a variety of substrates, provides for excellent adhesion, to a method of coating a substrate using the same, and to coated substrates obtained therefrom.

19 Claims, No Drawings

WATER-BORNE POLYMER COMPOSITION

CROSS-REFERENCE TO RELATED APPLICATION

This application is a U.S. national stage entry under 35 U.S.C. § 371 of International Application No. PCT/EP2018/081109 filed Nov. 13, 2018, which claims priority to European application No. 17201498.7 filed Nov. 14, 2017, the whole content of this application being incorporated herein by reference for all purposes.

TECHNICAL FIELD

This invention pertains to a water-borne polyaryletherketone composition which possesses outstanding shelf stability and which, when coated onto a variety of substrates, provides for excellent adhesion, to a method of coating a substrate using the same, and to coated substrates obtained therefrom.

BACKGROUND ART

Polyaryl ether ketone materials are known as high performance plastics with high thermal resistance, which are used for a number of industrial applications where resistance to extreme conditions is required.

For instance, Oil&Gas exploration and exploitation requires materials able to resist high temperature and pressure, and capable of maintaining the required performances upon prolonged exposure in the said extreme pressure and temperature conditions to aggressive chemicals present in downhole environment, including notably salt water, hydrocarbons, $CO_2$, $H_2S$, etc.

Still, in the domain of medical devices, polyaryl ether ketone materials have become the materials of choice for non-metal structural body implants, such as bone replacements and prostheses, thanks to their un-matched mechanical properties and ability to sustain body fluids environment.

While parts injection-molder or otherwise machined from polyaryl ether ketone materials have presently gained wide use, there's an increased interest in providing solutions for applying thin layers of polyaryl ether ketone materials to a variety of substrates, so as to confer to the final assembly the advantageous properties which polyaryl ether ketone materials are bestowed with.

Methods for applying layers of polyaryl ether ketone powders via known powder-coating techniques are known; nevertheless, liquid coating formulations, and more particularly, water-borne compositions are representing a present shortfall in the market, to match requirements for adhesion to different substrates and adequate shelf-life stability, to enable final user to make use of ready-made formulations.

Different solutions have been already proposed for primer compositions that provide adhesion of different types of engineering plastics coating, on metallic and non-metallic substrates. A class of polymeric adhesion promoters, of particular interest to be mixed with different polymers, consists of polyimides, especially polyamideimides (PAI). Indeed, polyimides possess usually excellent film forming capabilities and they provide usually high chemical and thermal resistance, while at the same time promoting adhesion towards a variety of substrates.

Since polyimides, especially polyamideimides, in their polyamic acid form, were deemed to undergo hydrolytic degradation in aqueous medium, even at room temperature, their molecular weight being irreversibly reduced, with negative impacts on final mechanical properties, they were used in the past as film-forming substances not in aqueous medium but dissolved in an appropriate organic solvent.

Increased attention to the environmental hazard prevention has generated a strong need for moving towards purely solvent-free primer compositions, while maintaining or even improving coating performances, in particular substrate adhesion and mechanical and chemical resistance.

In the technique, various methods were thus studied in order to improve the stability and the solubility in water of polyimides, especially of PAI, to reduce the amount of organic solvent, as, because of their strong affinity for polymer itself, their elimination requires extended drying periods, often at reduced pressure. Beside the energy costs associated with drying and curing, the necessity for recovery of the volatilized solvent, due to environmental considerations, as well as the cost of the solvent, substantially impacts the commercial attractiveness of solvent-based solution.

WO 2015/012423 relates to a water-based polymer composition, comprising a polymer, which may be selected in a long list of thermoplasts, which includes notably also polyarylether ketones; an aromatic polyamic acid, whereas part or all of the amic acid groups are neutralized by at least one basic compound (B); water; and optionally, at least one organic solvent (S) of the polymer (PAI), in an amount of less than 20 percent wt with respect to the weight of the aromatic polyamic acid. The water-based polymer compositions of this invention may be notably found useful for coating applications where organic solvents may not be desired or tolerated.

Similarly, FR 2969635 discloses a method for manufacturing an article comprising a coating based of polyaryletherketone (PAEK), whereas said method comprises: applying, on the article, an aqueous dispersion of PAEK comprising polyamic acid at least partially neutralized with a base; and carrying out the cooking of the aqueous dispersion for the coating. The polyaryletherketone material is provided under the form of particles, which have a size of at least 20 nm, and at most 125 μm, with embodiments exemplified which are representative of a particle size of 50 μm.

Nevertheless, the afore-mentioned coating composition fails in stability, in that they cannot be stored for prolonged period without incurring in substantial sedimentation phenomena, which are incompatible with requirements for easy processing.

SUMMARY OF THE INVENTION

According to the present invention, the above-mentioned difficulties are remarkably overcome by a water-borne polymer composition, comprising:
- particles of at least one polyaryletherketone polymer [polymer (PAEK)], said particles possessing an average particle size $d_{50}$ of at least 1 and of at most 25 μm;
- at least one aromatic polyamic acid comprising recurring units, more than 50% mol of said recurring units comprising at least one aromatic ring and at least one amic acid group and/or imide group [recurring units ($R_{PAI}$)], more than 50% mol of recurring units ($R_{PAI}$) comprising at least one amic acid group [polymer (PAI)], wherein part or all of the amic acid groups are neutralized by at least one basic compound (B);
- water;
- at least one organic solvent (S), different from basic compound (B), selected from the group consisting of mono-alcohols, polyols, glycol derivatives and their mixtures, said solvent (S) being present in an amount of at least 1 and at most 15% wt with respect to the total weight of the composition.

The Applicant has found that solely by combining the afore-mentioned amount of organic solvent (S), polymer (PAI) and particles of polymer (PAEK) possessing the above-detailed particle size it is possible to obtain a waterborne polymer composition having outstanding shelf-life, which has been found to be well suited for providing for coatings having high adhesion to substrates, and containing a relatively low amount of certain particular organic solvent, being hence more desirable for use where energy costs and environmental factors are important considerations.

Polymer (PAEK)

As used herein, the expression "poly(aryl ether ketone)" or polymer (PAEK)" is hereby used to denote any polymer comprising more than 50% moles of recurring units ($R_{PAEK}$) comprising a —O—Ar'—C(=O)—Ar*— group, where Ar' and Ar*, equal to or different from each other, are aromatic groups, the % moles being based on the total number of moles in the polymer (PAEK). The recurring units ($R_{PAEK}$) are generally selected from the group consisting of units of formulae (K-A) to (K-O) below, and mixtures of two of more than two of the same:

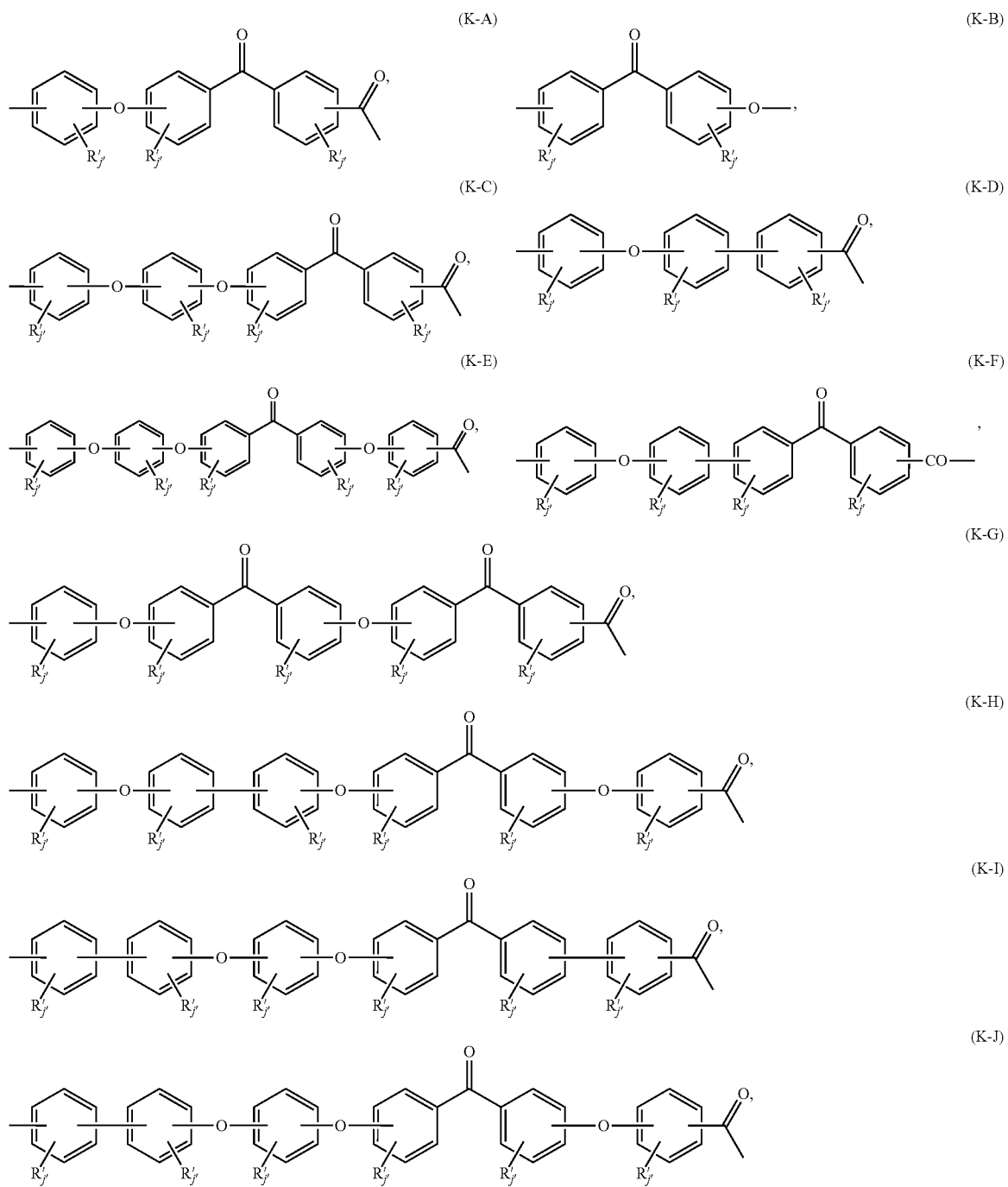

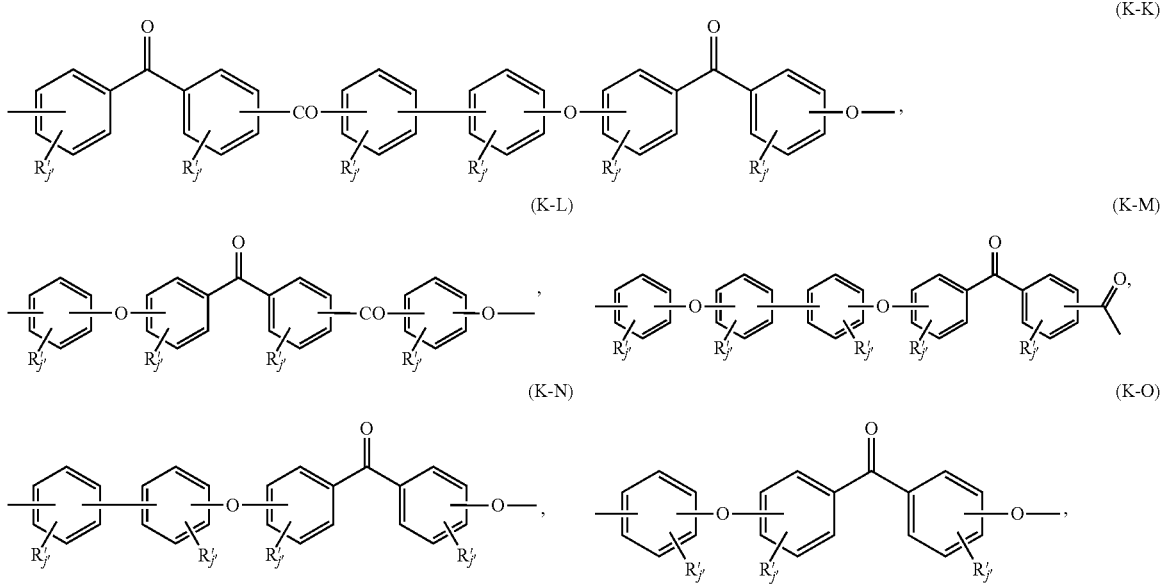

wherein in each of formulae (K-A) to (K-O) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4, preferably j' being equal to zero.

Each phenylene moiety of the recurring unit ($R_{PAEK}$) may, independently from one another, have a 1,2-, a 1,3- or a 1,4-linkage to the other moieties. According to an embodiment, each phenylene moiety of the recurring unit ($R_{PAEK}$), independently from one another, has a 1,3- or a 1,4-linkage to the other phenylene moieties. According to another embodiment yet, each phenylene moiety of the recurring unit ($R_{PAEK}$) has a 1,4-linkage to the other phenylene moieties.

According to preferred embodiment's, j' is zero for each R' in formulae (K-A) to (K-O) as above detailed.

According to preferred embodiment's, the recurring units ($R_{PAEK}$) are selected from the group consisting of units of formulae (J'-A) to (J'-D):

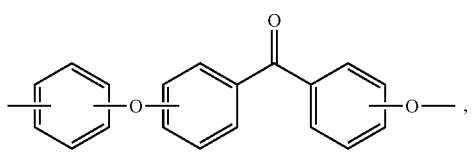

(J'-A)

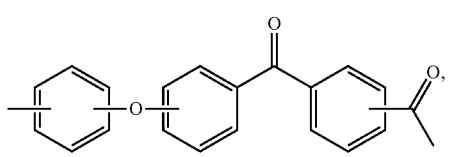

(J'-B)

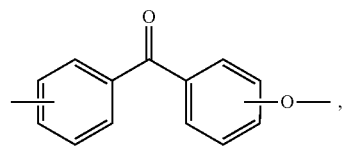

(J'-C)

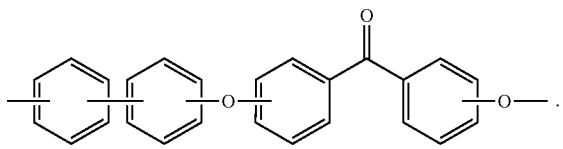

(J'-D)

In some embodiments, the polymer (PAEK) is a poly (ether ether ketone) [polymer (PEEK)]. As used herein, the expression "poly(ether ether ketone)" or "polymer (PEEK)" denotes any polymer of which more than 50% moles of the recurring units ($R_{PAEK}$) are recurring units of formula (K'-A):

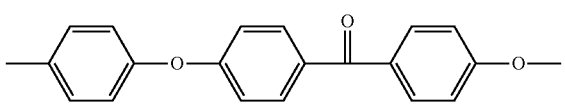

(K'-A)

the % moles being based on the total number of moles of recurring units in the polymer (PEEK).

According to these embodiments, at least 60% moles, at least 70% moles, at least 80% moles, at least 90% moles, at least 95% moles, at least 99% moles, or even substantially all recurring units ($R_{PAEK}$) are recurring units (K'-A), as above detailed. Preferred polymers (PEEK) are those wherein substantially all recurring units are units of formula (K'-A), being understood that end-groups, defects and minor amounts of impurities may be present.

In other embodiments, the polymer (PAEK) is a poly (ether ketone ketone) [polymer (PEKK)]. As used herein, the expression "poly(ether ketone ketone)" or "polymer (PEKK)" denotes any polymer of which more than 50% moles of the recurring units ($R_{PAEK}$) are recurring units of formula (K'-B) and/or recurring units of formula (K"-B):

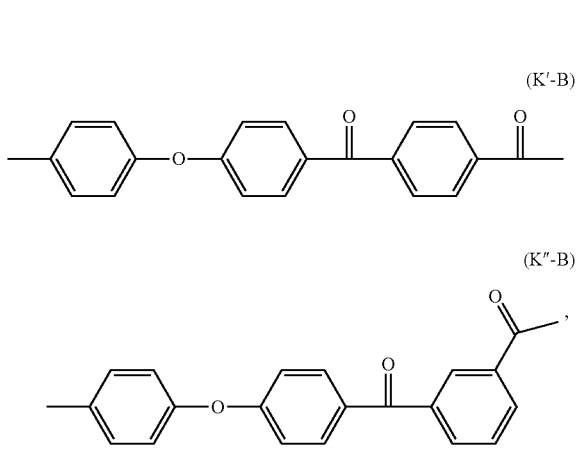

the % moles being based on the total number of moles of recurring units in the polymer (PEKK).

According to these embodiments, at least 60% moles, at least 70% mole, at least 80% moles, at least 90% moles, at least 95% moles, at least 99% moles, or even substantially all of the recurring units ($R_{PAEK}$) are recurring units (K'-B) or (K"-B), or preferably a combination thereof. Preferred polymers (PEKK) are those wherein substantially all recurring units are units of formula (K'-B) and/or (K"-B), being understood that end-groups, defects and minor amounts of impurities may be present.

In yet other embodiments, the polymer (PAEK) is a poly(ether ketone) [polymer (PEK)]. As used herein, the expression "poly(ether ketone)" and "polymer (PEK)" denotes any polymer of which more than 50% moles of the recurring units ($R_{PAEK}$) are recurring units of formula (K"-C):

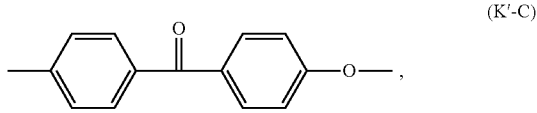

the % moles being based on the total number of moles of recurring units in the polymer (PEK).

According to these embodiments, at least 60% moles, at least 70% mole, at least 80% moles, at least 90% moles, at least 95% moles, at least 99% moles, or even substantially all of the recurring units ($R_{PAEK}$) are recurring units (K'-C). Preferred polymers (PEK) are those wherein substantially all recurring units are units of formula (K'-C), being understood that end-groups, defects and minor amounts of impurities may be present.

In some embodiments, the polymer (PAEK) is a poly(ether diphenyl ether ketone) [polymer (PEDEK)]. As used herein, the expression "poly(ether diphenyl ether ketone)" or "polymer (PEDEK)" denotes any polymer of which more than 50% moles of the recurring units ($R_K$) are recurring units of formula (K'-D):

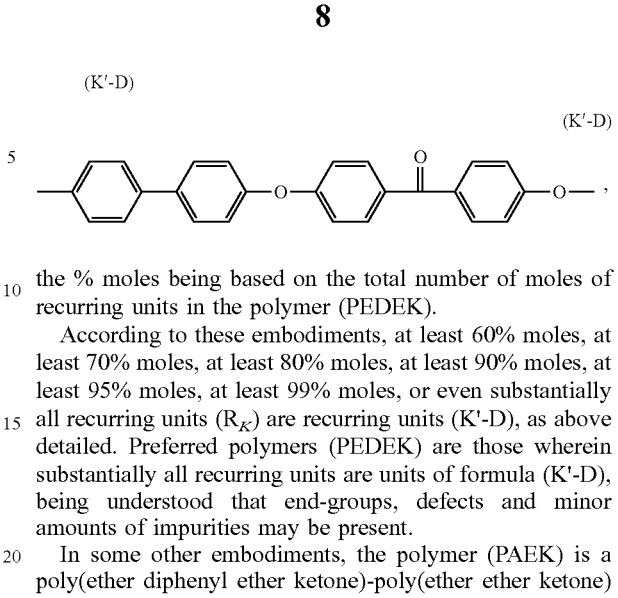

the % moles being based on the total number of moles of recurring units in the polymer (PEDEK).

According to these embodiments, at least 60% moles, at least 70% moles, at least 80% moles, at least 90% moles, at least 95% moles, at least 99% moles, or even substantially all recurring units ($R_K$) are recurring units (K'-D), as above detailed. Preferred polymers (PEDEK) are those wherein substantially all recurring units are units of formula (K'-D), being understood that end-groups, defects and minor amounts of impurities may be present.

In some other embodiments, the polymer (PAEK) is a poly(ether diphenyl ether ketone)-poly(ether ether ketone) copolymer [polymer (PEEK-PEDEK)]. As used herein, the expression "poly(ether diphenyl ether ketone)-poly(ether ether ketone) copolymer" or "polymer (PEEK-PEDEK)" denotes any polymer of which more than 50% moles of the recurring units ($R_K$) are a mixture of recurring units of formula (K'-A) and (K'-D), in the relative molar proportions (K'-A):(K'-D) of 95:5 to 5:95, preferably of 80:20 to 20:80.

Preferably, the polymer (PAEK) exhibits a melt viscosity measured according to ASTM D3835 at 400° C. and 1000 $s^{-1}$ using a tungsten carbide die of 0.5×3.175 mm of at least 0.07 kPa·s, more preferably at least 0.09 Pa·s, most preferably at least 0.12 kPa·s, and/or of at most 0.65 kPa·s, more preferably at most 0.55 kPa·s, more preferably at most 0.50 kPa·s, most preferably at most 0.45 kPa·s.

According to a preferred embodiment, the PAEK is PEEK. PEEK is notably commercially available as KetaSpire® PEEK from Solvay Specialty Polymers USA, LLC.

The water-borne polymer composition of the invention comprises advantageously at least 10% wt, preferably at least 15% wt, more preferably at least 20% wt of polymer (PAEK) with respect to the total weight of the composition.

The water-borne polymer composition of the invention comprises advantageously at most 45% wt, preferably at most 43% wt, more preferably at most 42% wt of polymer (PAEK) with respect to the total weight of the composition.

Water-borne polymer compositions comprising from 26 to 38% wt of polymer (PAEK) with respect to the total weight of the composition gave very satisfactory results.

As said polymer (PAEK) is present in the composition of the invention under the form of particles, i.e. of discrete three-dimensional objects, which can be characterized by dimensional features through appropriate analytical techniques.

As said, particles of polymer (PAEK) of the composition of the present invention possesses an average particle size $d_{50}$ of at least 1 µm, preferably at least 3 µm, more preferably at least 5 µm, even more preferably at least 10 µm and/or of at most 25 µm, preferably at most 22 µm, more preferably at least 20 µm.

The expression "average particle size $d_{50}$" is used within the context of the present invention according to its usual meaning, i.e. is the size at which 50% in volume of the polymer (PAEK) is comprised of particles with a diameter less than this value.

Similarly, the expression "average particle size $d_{10}$" is the size at which 10% in volume of the polymer (PAEK) is comprised of particles with a diameter less than this value; the expression "average particle size $d_{90}$" is the size at which 90% in volume of the polymer (PAEK) is comprised of particles with a diameter less than this value.

Particles of polymer (PAEK) of the composition of the present invention possesses an average particle size $d_{10}$ of at least 0.5 µm, preferably at least 1 µm, more preferably at least 2 µm and/or of at most 18 µm, preferably at most 17 µm, more preferably at least 15 µm, even more preferably at most 13 µm, most preferably at most 10 µm.

Particles of polymer (PAEK) of the composition of the present invention possesses an average particle size $d_{90}$ of at least 10 µm, preferably at least 12 µm, more preferably at least 15 µm and/or of at most 40 µm, preferably at most 38 µm, more preferably at most 35 µm.

The average particle size $d_{10}$, $d_{50}$, $d_{90}$ are determined by laser light scattering according to ISO 13320.

Polymer (PAI)

As said, polymer (PAI) comprises recurring units, more than 50% mol of said recurring units comprising at least one aromatic ring and at least one amic acid group and/or imide group [recurring units ($R_{PAI}$)], more than 50% mol of recurring units ($R_{PAI}$) comprising at least one amic acid group, wherein part or all of the amic acid groups are neutralized by at least one basic compound (B).

The recurring units ($R_{PAI}$) are advantageously chosen from:

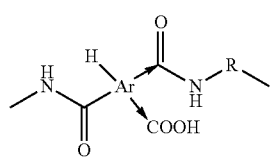

($R_{PAI}$-A)

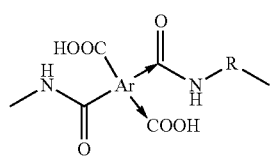

($R_{PAI}$-B)

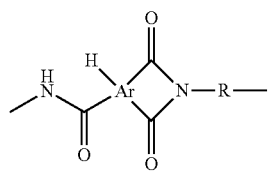

($R_{PAI}$-C)

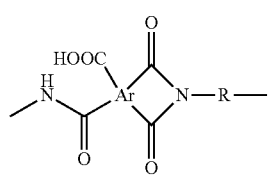

($R_{PAI}$-D)

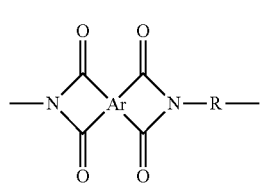

($R_{PAI}$-E)

wherein:

the → denotes isomerism so that in any recurring unit within the aromatic polyamic acid structure the groups to which the arrows point may exist as shown or in an interchanged position Ar is an aromatic tetravalent group, which may comprise one or more than one aromatic ring, and which are preferably selected from the group

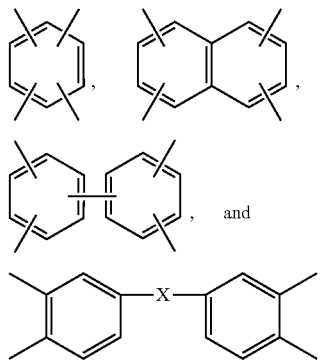

consisting of:

with X being selected from the group consisting of —O—, —C(O)—, —S—, —SO$_2$—, —CH$_2$—, —C(CF$_3$)$_2$—, —(CF$_2$)$_n$— with n=0, 1, 2, 3, 4 or 5;

—R is an aromatic divalent group, which may comprise one or more than one aromatic ring, and which are preferably selected from the group

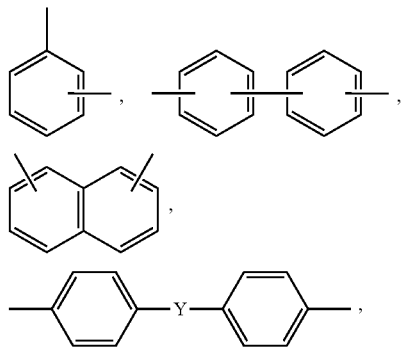

consisting of:

with Y being selected from the group consisting of —O—, —C(O)—, —S—, —SO$_2$—, —CH$_2$—, —C(CF$_3$)$_2$—, —(CF$_2$)$_n$— with n=0, 1, 2, 3, 4 or 5,

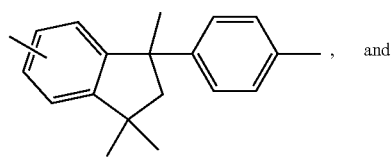

-continued

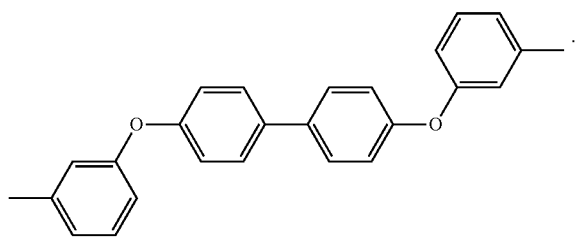

Recurring units (R_{PAI}) are more preferably chosen from the group consisting of units (i), (ii) and (iii), as below detailed:

(i)

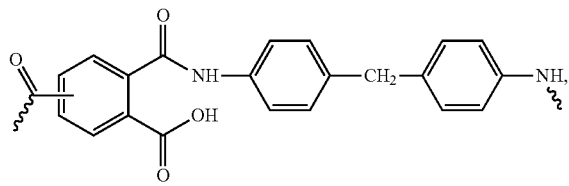
(i-a)

and/or the corresponding imide-group containing recurring unit:

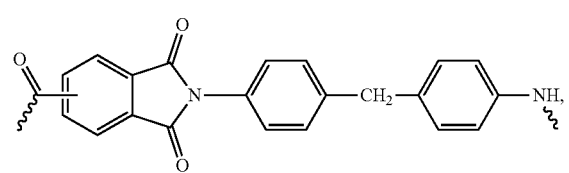
(i-b)

wherein the attachment of the two amide groups to the aromatic ring as shown in (i-a) will be understood to represent the 1,3 and the 1,4 polyamide-amic acid configurations;

(ii)

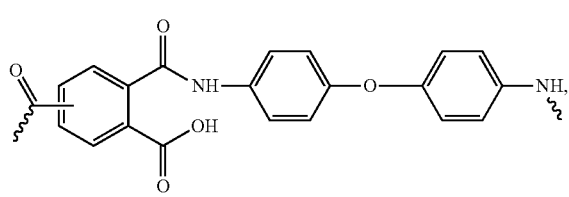
(ii-a)

and/or the corresponding imide-group containing recurring unit:

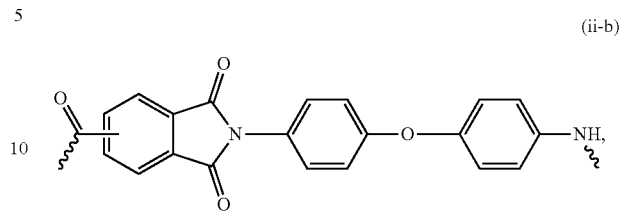
(ii-b)

wherein the attachment of the two amide groups to the aromatic ring as shown in (ii-a) will be understood to represent the 1,3 and the 1,4 polyamide-amic acid configurations; and (iii)

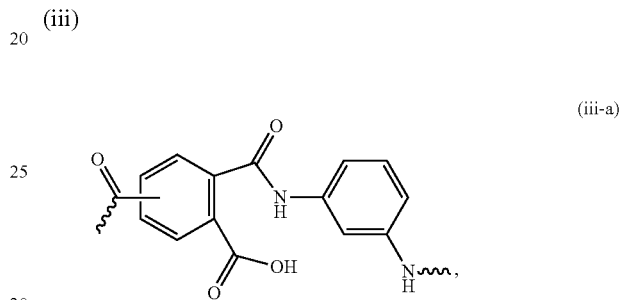
(iii-a)

and/or the corresponding imide-group containing recurring unit:

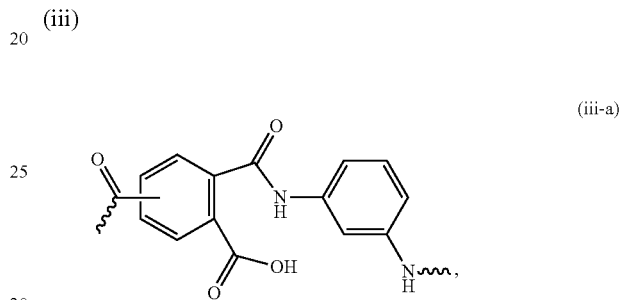
(iii-b)

wherein the attachment of the two amide groups to the aromatic ring as shown in (iii-a) will be understood to represent the 1,3 and the 1,4 polyamide-amic acid configurations.

Recurring units (R_{PAI}) are preferably recurring units (i) or a mix of recurring units (ii) and (iii).

Very preferably, the polymer (PAI) comprises more than 90% mol of recurring units (R_{PAI}). Still more preferably, it contains no recurring unit other than recurring units (R_{PAI}).

Excellent results were obtained with polymer (PAI) consisting of recurring units (i) or of a mix of recurring units (ii) and (iii).

As said, more than 50% mol of recurring units (R_{PAI}) comprise at least one amic acid group.

Amount of recurring units comprising amic group can be determined by any suitable technique, such as, notably spectroscopic techniques or titration techniques which are well known to those of ordinary skills in the art.

When recurring units ($R_{PAI}$) are selected from those of formulae ($R_{PAI}$-A), ($R_{PAI}$-B), ($R_{PAI}$-C), ($R_{PAI}$-D), ($R_{PAI}$-E), as detailed above, the molar percentage of recurring units ($R_{PAI}$) comprising at least one amic acid group may be expressed as follows:

$$\frac{\{[(R_{PAI}\text{-}A)\text{ units}] + 2 \cdot [(R_{PAI}\text{-}B)\text{ units}] + [(R_{PAI}\text{-}D)\text{ units}]\}}{\{[(R_{PAI}\text{-}A)\text{ units}] + 2 \cdot [(R_{PAI}\text{-}B)\text{ units}] + [(R_{PAI}\text{-}C)\text{ units}] + [(R_{PAI}\text{-}D)\text{ units}] + [(R_{PAI}\text{-}E)\text{ units}]\}} \times 100$$

where [($R_{PAI}$-A) units], [($R_{PAI}$-B) units], [($R_{PAI}$-C) units], [($R_{PAI}$-D) units], and [($R_{PAI}$-E) units] denote, respectively molar concentration of the different recurring units ($R_{PAI}$) as above described.

In preferred embodiments, at least preferably 55% mol, more preferably 60% mol of recurring units ($R_{PAI}$) comprise at least one amic acid group.

The acid number (milligrams of KOH/gram) of the polymer (PAI) is advantageously at least 80, more preferably at least 90 and still more preferably at least 100, and may be up to the theoretical acid number for a resin that comprises only amic acid units.

The number average molecular weight ($M_n$) of the polymer (PAI) is advantageously at least 1000, preferably at least 1500, more preferably at least 2000.

The number average molecular weight ($M_n$) of the polymer (PAI) is advantageously at most 20000, preferably at most 15000, more preferably at most 10000.

The inherent viscosity of the polymer (PAI) is at least 0.1, preferably at least 0.15, more preferably at least 0.2 dl/g when measured as a 0.5% wt solution in N,N-dimethylacetamide at 30° C.

The polymer (PAI) can be notably manufactured by a process including the polycondensation reaction between (I) at least one acid monomer chosen from pyromellitic anhydride, bis(3,4-dicarboxyphenyl)ether dianydride, trimellitic anhydride and trimellitic anhydride monoacid halides and (II) at least one comonomer chosen from diamines and diisocyanates.

Among the pyromellitic anhydride, bis(3,4-dicarboxyphenyl)ether dianydride, trimellitic anhydride and trimellitic anhydride monoacid halides, trimellitic anhydride monoacid chloride is preferred.

The comonomer comprises preferably at least one aromatic ring. Besides, it comprises preferably at most two aromatic rings. More preferably, the comonomer is a diamine. Still more preferably, the diamine is chosen from the group consisting of 4,4'-diaminodiphenylmethane, 4,4'-diaminodiphenylether, m-phenylenediamine, para-phenylenediamine, 4,4'-diaminodiphenylsulfone, 4,4'-diaminodiphenylsulfide, and mixtures thereof.

The polycondensation reaction is advantageously carried out under substantially anhydrous conditions in a polar solvent and at a temperature below 150° C., employing substantially stoichiometric quantities of the acid monomer and of the comonomer. A slight stoichiometric excess, usually from about 0.5 to about 5 mole %, of either monomer, preferably of the acid monomer, can be employed if desired in order to control molecular weight; alternatively a monofunctional reactant can be employed as an endcapping agent for this purpose, and to improve stability.

The polymer (PAI) is advantageously isolated in solid form under mild conditions, preferably by being coagulated or precipitated from the polar reaction solvent by adding a miscible non-solvent, for example water, a lower alkyl alcohol or the like. Optionally, the solid resin may then be collected and thoroughly washed with water, and centrifuged or pressed to further reduce the water content of the solid without applying heat. Non-solvents other than water and lower alkyl alcohols are known and have been used in the art for precipitating polymer (PAI) from solution including, for example, ethers, aromatic hydrocarbons, ketones and the like.

The water-borne polymer composition of the invention comprises advantageously at least 0.01% wt, preferably at least 0.05% wt, more preferably at least 0.1% wt of polymer (PAI) with respect to the total weight of the composition.

The water-borne polymer composition of the invention comprises advantageously at most 15% wt, preferably at most 10% wt, more preferably at most 8% wt of polymer (PAI) with respect to the total weight of the composition.

Water-borne polymer compositions comprising from 0.5 to 7% wt of polymer (PAI) with respect to the total weight of the composition gave very satisfactory results.

The minimum amount of basic compound (B) employed will be approximatively the stoichiometric amount required to neutralize the amic acid groups in the polymer (PAI), and preferably will be at least 0.8, more preferably at least 0.9 mole for each mole of amic acid groups in the polymer (PAI).

The maximum amount of basic compound employed will be advantageously at most 5 moles, preferably 4.5 moles, more preferably at most 4.0 moles for each mole of amic acid groups in the polymer (PAI).

It is known that water-borne polymer compositions comprising aromatic polymer (PAI) and containing greater than 100% of the stoichiometric or neutralizing amount of basic compound, based on the amount of amic acid groups present in the polymer (PAI), are markedly more stable toward hydrolysis, hence formulations based on salt of polymer (PAI) comprising similarly high levels of base (B) will be preferred.

Still greater levels of basic compound (B) may be conveniently employed without detrimentally affecting the coating properties of the water-borne polymer composition.

In addition to improving the solution stability of these compositions, large excesses of the basic compound may be notably found to improve the rate of dissolution of the solid resin.

To neutralize part or all of the amic acid groups of the polymer (PAI), the polymer (PAI) is advantageously reacted with a basic compound (B) suitable for neutralizing carboxylic groups of $R_{PAI}$ recurring units in aqueous medium.

Neutralizing and dissolving the polymer (PAI) may be conveniently carried out in a single operation by adding the polymer (PAI), preferably in solid form, to the requisite quantity of water containing the basic compound. Combining the polymer (PAI) in solid form with an amount of a suitable basic compound (B) effective to substantially neutralize the amic acid group and form the corresponding salt notably suffice to dissolve the polymer (PAI) and there is no need of additional organic solvent or coalescing agent.

The amount of water employed in this stage will generally be sufficient to provide a stock solution containing from 0.5 to about 30% wt, preferably from about 1 to about 25% wt, more preferably from about 1 to about 15% wt of polymer (PAI).

Any convenient method of combining the components may be employed in neutralizing part or all of the amic acid group of the polymer (PAI).

The polymer (PAI) in solid form may be added in increments to a stirred mixture of the basic compound (B) and water, continuing the stirring until the polymer (PAI) has been dissolved.

Alternatively, the basic compound (B) can be added slowly to a stirred suspension of the polymer (PAI) in water, with continued stirring until the solid dissolves.

As with any acid-base reaction, external cooling may be found necessary initially; subsequent warming and stirring may be desirable to complete dissolution of the polymer (PAI) in a reasonable time period.

Preferably, the mixture of the polymer (PAI) and the basic compound (B) is heated at a temperature of at least 40° C., preferably of at least 45° C., more preferably of at least 50° C.

Suitable basic compounds (B) are notably all those can neutralize the amic groups of the recurring units $R_{PAI}$ of the polymer (PAI).

Inorganic and organic bases can be used for neutralizing part or all of the amic acid groups of the polymer (PAI).

Non limitative examples of inorganic bases are notably alkaline and alkaline-earth metal hydroxides, such as NaOH, KOH, Mg(OH)$_2$, ammonia and the like.

Non limitative examples of organic bases are notably organic amines, such as aliphatic, aromatic, heterocyclic or heteroaromatic amines.

Preferably the basic compound (B) is a tertiary amine. The tertiary amine may be notably a tri-($C_1$-$C_4$ alkyl)amine such as, for example, trimethylamine, N,N-dimethylethylamine, N,N-dimethylpropylamine, triethylamine, tributylamine or the like. Cyclic tertiary amines may also be found useful, as may any of the variety of well known, water-miscible, tertiary alkanol amines including N,N-dimethylethanolamine, N-butyldiethanolamine diethyl-2-hydroxyethylamine and the like. Aromatic amines, such as N,N-dimethylaniline, pyridine, N-methylpyrrole can also be employed. Although polyfunctional amines such as N,N'-dimethylpiperidine, as well as N,N,N'N'-tetraalkyl-alkaline diamines and poly-N-alkylated alkalene triamines may also be found effective, the polyfunctional amines may tend to form associative crosslinks and gel, and will be less preferred.

Most preferred basic compound (B) is chosen from the group consisting of N,N-dimethylethanolamine, N-butyldiethanolamine, diethyl-2-hydroxyethylamine and mixture thereof.

Tertiary amines are notably known to increase the rate of thermal imidization and curing of polymer (PAI), and may be effective in promoting rapid curing of polymer (PAI) films and coatings.

The water-borne polymer composition of the invention comprises at least one organic solvent (S) different from basic compound (B), in an amount of at least 0.5% wt and at most 25% wt with respect to the total weight of the composition.

Solvent (S)

The water-borne polymer composition comprises the organic solvent (S) preferably in an amount not exceeding 15% wt, more preferably not exceeding 14% wt, most preferably not exceeding 13% wt with respect to the weight of the composition.

Nevertheless, the water-borne polymer composition comprises the said organic solvent (S) in an amount of at least 0.5% wt, preferably at least 1% wt, more preferably at least 1.5% wt.

The organic solvent (S), different from basic compound (B), is selected from the group consisting of mono-alcohols, polyols, glycol derivatives and their mixtures As used herewith, the term "mono-alcohols" indicates an organic solvent comprising at least one hydroxyl group and being free from functional groups other than said hydroxyl group. Non-limiting examples are isopropanol, methanol, ethanol, butanol and their mixtures.

As used herewith, the term "polyol" indicates an organic solvent comprising two or more hydroxyl groups, e.g. a diol comprising two hydroxyl groups, such as ethylene glycol and propylene glycol, and polyols comprising three hydroxyl groups such as glycerin.

As used herewith, the term "glycol derivative" indicates a solvent deriving from a compound comprising at least two hydroxyl groups, wherein at least one of the hydroxyl groups is part of an ether or of an ester group. Preferably, at least one glycol derivative solvent has a boiling point of at least 100° C.

Preferably, the glycol derivative complies with general formula (I):

(I)

wherein R is a $C_1$-$C_6$ divalent hydrocarbon group, linear or branched, optionally containing one or more ether bonds; X and Y, equal or different each other, are independently an hydrogen atom, a $C_1$-$C_6$ alkyl group, linear or branched, or a group of formula —C(O)—R', with R' being a $C_1$-$C_6$ alkyl group, linear or branched, with the provision that at least one of X and Y is not an hydrogen atom, and n is an integer between 1 and 3.

Preferably, the glycol derivative complies with formula (II) here below:

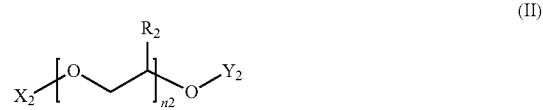

(II)

wherein $R_2$ is an hydrogen atom or a methyl group; $X_2$ and $Y_2$, equal or different each other, are independently an hydrogen atom, a —R" group or a —C(O)—R" group, with R" being a $C_1$-$C_4$ alkyl group, with the provision that at least one of $X_2$ and $Y_2$ is not an hydrogen atom; and n2 is an integer between 1 and 3.

Preferred organic solvents (S) are isobutyl alcohol (IBA), 1-propoxy-2-propanol (propylene glycol n-propyl ether, PNP), tripropylene glycol (TPG), tripropylene glycol monomethyl ether (TPM), ((2-(2-methoxymethylethoxy)methylethoxy)-propanol (TPG methyl ether) and mixtures thereof.

Water-Borne Polymer Composition

As said, the composition is water-borne and advantageously comprises water as major liquid medium.

The amount of water, while complementing necessarily the other ingredients in the composition is generally of at least 30% wt, preferably at least 35% wt, more preferably at least 38% wt, with respect to the total weight of the composition.

Upper amounts for water are not particularly limited, except because of the presence of the other listed mandatory ingredients.

To the sake of ensuring suitable coated weight on the substrate, the water-borne polymer composition generally possesses a liquid viscosity of at least 500, at least 800 preferably at least 1000 mPa·sec, when measured at 22° C., using a Brookfield viscometer operating at 10 rpm.

Conversely, in order to ensure acceptable liquid processability during coating via different coating techniques, it is generally preferred for the water-borne polymer composition possessing a liquid viscosity of at most 5000 mPa·sec, at most 4700 mPa·sec, when measured at 22° C., using a Brookfield viscometer operating at 10 rpm.

Optionally, the water-borne polymer composition can further comprise usual ingredients of coating compositions, notably:
(i) thixotropic agents, otherwise referred to as rheological additives, i.e. compounds which allow specific modification of the liquid viscosity of the composition, at various shear rate, matching hence requirements at different stages of processing;
(ii) surfactants, i.e. compounds able to modify surface tension of the water-borne polymer composition;
(iii) anti-foam agents, such as notably tributylphosphate;
(iii) pigments like carbon black, silicates, metal oxides and sulfides;
(iv) inorganic fillers/hardeners, such as silicate compounds, e.g. metal silicate (aluminium silicate); particulate metal oxides, such as $TiO_2$, $Al_2O_3$ and $SiO_2$, zeolites, mica, talcum, kaolin; carbon fibres, glass fibres, metal sulfates, such as $BaSO_4$, $CaSO_4$, $SrSO_4$;
(v) organic fillers, preferably thermally stable polymers, like aromatic polycondensates different from polymer (PAEK);
(vi) adhesion promoters, like colloidal silica and a phosphate compound, such as metal phosphate, e.g. Zn, Mn or Fe phosphate.

Any type of pigments may used in the invention. Preferred pigments are, or will comprise, one or more of the following: titanium dioxide which is available from Whittaker, Clark & Daniels, South Plainfield, N.J., USA; Arctic blue #3, Topaz blue #9, Olympic blue #190, Kingfisher blue #211, Ensign blue #214, Russet brown #24, Walnut brown #10, Golden brown #19, Chocolate brown #20, Ironstone brown #39, Honey yellow #29, Sherwood green #5, and Jet black #1 available from Shepard Color Company, Cincinnati, Ohio, USA.; black F-2302, blue V-5200, turquoise F-5686, green F-5687, brown F-6109, buff F-6115, chestnut brown V-9186, and yellow V-9404 available from Ferro Corp., Cleveland, Ohio, USA and METEOR® pigments available from Engelhard Industries, Edison, N.J., USA.

A thixotropic which has been found particularly useful is a compound based on urea-modified polyurethanes, such as those commercialized under trade names BYK-420®, BYK-425® and BYK-7420®, by BYK Altana group; as an alternative, certain silicate compounds or synthetic clays such as BENTONITE®, LAPONITE® and analogous compounds may also be used as thixotropic agents.

Preferably, the composition of the invention comprises at least one thixotropic agent.

It was found that the presence of at least one thixotropic agent advantageously enhance the stability against sedimentation of the composition according to the invention, so that it can applied by spray-coating without further treatment up to 12-24 hours of storage after it is formed or obtained as a homogeneous dispersion by mild stirring or shaking. When present, the amount of said at least one thixotropic agent in the composition according to the invention is of 0.01 to 2% weight parts per weight parts of solids in the composition.

Additives, such as chemicals helpful in coating formation or flow promoters, may be incorporated into the water-borne polymer composition. Examples of these additives are Lanco™ Flow P10 available from Lubrizol, Wickliffe, Ohio, USA and MODAFLOW® Powder available from Solutia, St. Louis, Mo., USA.

Another object of the invention is a process for manufacturing the water-borne polymer composition as above described.

The water-borne polymer composition can be advantageously manufactured by dispersing the polymer (PAEK) as dry particles into the aqueous solution of the neutralized polymer (PAI) prepared as above described, in the presence or followed by addition of the solvent (S), as detailed above. Other components of the water-borne polymer composition, such as pigments and additives, may be added to the aqueous PAI solution either before or after the polymer (PAEK) is dispersed into the aqueous solution.

Optionally, a high-pressure homogenizer, a colloid mill, a fast pump, a vibratory agitator or an ultrasound device may be used to reduce the particle size of the polymer (PAEK) particles or of the other components while achieving an intimate mixture with the salt of polymer (PAI) in solution (co-grinding).

As a first alternative, the aqueous solution of the salt of polymer (PAI) can be notably blended with the aqueous dispersion of the polymer (PAEK) for manufacturing the water-borne polymer compositions of the invention. The apparatus used for the milling operation and subsequent blending with the aqueous dispersion of the polymer (PAEK) may be conventional. As non-limitative example of mixing device, mention may be made notably of mixing tanks with agitator blades.

As a second alternative, the polymer (PAI) and the basic compound (B) may be added to the polymer (PAEK) dispersion, in order to form the salt of the polymer (PAI) directly when preparing the composition. All the methods above described for obtaining the salt of the polymer (PAI) may be notably applied, provided that an aqueous dispersion of the polymer (PAEK) is used instead of simply water.

The water-borne polymer compositions of this invention may be notably found useful for coating applications where organic solvents may not be desired or tolerated.

The water-borne polymer compositions of this invention may be found particularly desirable in formulations intended for use in coating applications, providing an adherent, high strength continuous coating layer having improved toughness on a coated surface, exhibiting remarkable adhesion and film forming properties and enhancing the polymer (PAEK) dispersion stability (before coating) and thermal stability during curing or baking of the coating.

Water-borne polymer compositions of this invention thus may also be found particularly useful in providing formulations for use as primer for metal and glass, as coating formulations for fibres, textiles and non-woven fibrous supports, including notably glass fibres and mats and textiles therefrom; as enamels in container coating applications; as a binder layer for automotive finishes, to improve adhesion between existing layers of automotive finishes or with other metal finishes; as a chemically corrosion-resistant coating for metal or other substrates, as a binder layer for non-stick cookware; as a coating for tie bars for usage in cement; as a pre-treatment coating for polymer films such as, for example, polyester, polyamide and polyimide film, when used in a metalizing operation; as an adhesive to various plastic or metallic film materials such as liquid crystal polymers and polyimides.

The water-borne polymer composition as above described may be notably applied as primer or coating by spraying, brushing, roller-coating, dipping or by electrodeposition.

When used as a primer, if the substrate to be coated is metal, said substrate is generally pre-treated by grit blasting, by flame spraying of metals or metal oxides or by frit-coating, although the composition can also advantageously applied to phosphated and chromated substrates.

If the substrate to be coated is glass, it is preferably first grit-blasted or frit-coated. Nevertheless, the water-borne polymer compositions as above described can be also notably applied on smooth substrates, treated only by washing to remove grease and other contaminants which might interfere with adhesion, yielding good coating properties.

Otherwise, the water-borne polymer composition of the invention may be used as top-coat, protective coating or finishing layer, especially non-stick finishes, optionally applied on a primer layer in mono- or multilayer structure.

Another object of the present invention is hence a method of coating a substrate possessing at least one surface, said method comprising:

applying on at least a part of said surface the water-borne polymer composition, as above detailed, so as to obtain a wet layer on said surface; and drying and backing the said wet layer so as to obtain a coating layer on said surface.

The water-borne polymer composition of the invention is usually applied to at least one surface of said substrate to provide a wet layer having a thickness of at least 1 µm, preferably at least 5 µm, more preferably at least 8 µm and/or of at most 350 µm, preferably at most 300 µm, even more preferably at most 250 µm.

The wet layer of the water-borne polymer composition as above described is then air-dried and baked or cured at a temperature high enough to affect the imidization of the polymer (PAI) and the melting and coalescing of particles of polymer (PAEK).

The baking advantageously drives off the volatile materials present in the coating composition, including water and optionally the salt moiety of the polymer (PAI) salt as the imide bond are formed during baking, when the basic compound (B) is a volatile organic base; at the same time, baking advantageously effects coalescing into a film particles of polymer (PAEK), as above detailed.

The baking temperature for curing the water-borne polymer compositions as above described is advantageously at least 350° C., preferably at least 370° C., more preferably at least 375° C. and/or of at most 470° C., preferably of at most 455° C., more preferably of at most 440° C.

According to certain embodiments, an additional coating formulation different from the water-borne polymer composition of the invention may be applied on the layer of the said water-borne polymer composition, which has been previously primed. Top coatings on a substrate primed with the first preferred water-borne polymer composition of the invention (i.e. top coated primed substrate) may also be cured at these temperature ranges.

The water-borne polymer composition is generally baked from about 1 minute to about 30 minutes, preferably from about 5 minutes to about 20 minutes and most preferably from about 7 minutes to about 15 minutes. Each coating layer can be baked for the same amount of time; however, the typical baking time for top coat layers is generally dependent upon part/part mass and geometry.

The water-borne polymer composition as above described has several advantages over conventional compositions. During the drying and the baking there is a progressive and reasonably limited release of organic solvent, which have otherwise an environmentally acceptable profile. The bake temperature is reduced which reduces the overall energy costs for coating substrates. Also, it is possible to obtain a high build coating using water-borne polymer compositions with lower viscosities as a result of the lower baking temperature. The preheating process for substrates, particularly metal substrates, is eliminated with the water-borne polymer compositions of the invention.

Another object of the invention is thus an article comprising the water-borne polymer composition as above described.

According to a first embodiment, the invention pertains to a coated film comprising the water-borne polymer composition as above described.

According to a second embodiment, the invention also pertains to an intermediate layer (tie-layer) comprising the water-borne polymer composition of the invention. This tie-layer may be further comprised in a multilayer structure.

Thus, it is still an object of the invention a multilayer structure comprising at least one layer comprising the water-borne polymer composition as above described.

The water-borne polymer composition according to the invention are particularly useful for coatings having high adhesion to substrates, and containing a low amount of organic solvent, unlike prior art coating and primer formulations, yielding the corresponding articles as above described; the water-borne polymer compositions and the articles according to the invention are therefore more desirable for use where energy costs and environmental factors are important considerations.

Should the disclosure of any patents, patent applications, and publications which are incorporated herein by reference conflict with the description of the present application to the extent that it may render a term unclear, the present description shall take precedence.

The present invention is described in greater detail below by referring to the Examples; however, the present invention is not limited to these examples.

EXAMPLES

Raw Materials:

TORLON® PAI 10174 (PAI-1 solution, hereunder) is an aqueous solution of 10.6% wt of PAI AI-50, possessing an acid number of 110 mg KOH/g and having more than 60% mol of units in amic acid (non-imidized) form, further including 7.5% wt of 2,2-butyliminodiethanol with respect to the weight of polymer (PAI).

KETASPIRE® PEEK KT 880 (PEEK-1) is a polyetheretherketone powder which has been milled so as to possess an average particle size such that $d_{10}$=6.9 µm, $d_{50}$=14.0 µm and $d_{90}$=23.1 µm.

KETASPIRE® PEEK KT 880 (PEEK-2) is a polyetheretherketone powder which has been milled so as to possess an average particle size of $d_{10}$=15.5 µm, $d_{50}$=31.8 µm and $d_{90}$=67.4 µm.

BYK 7420 ES is a thixotropic agent, commercially available from BYK Altana Group.

Tributylphosphate is an anti-foam agent, commercially available from The Dow Chemical Company.

Mackamine® LA is N,N-dimethyldidecylamine-N-oxide surfactant, commercially available from Rhodia.

A solvent mix composed of isopropyl alcohol (IPA) (26% wt); isobutyl alcohol (4% wt); propylene glycol n-propyl ether (PNP) (20% wt); tripropylene glycol monomethylether (TPM) (20% wt); an tripropylene glycol (TPG) (30% wt) was used; all mentioned solvents were supplied from The Dow Chemical Company (Solvent Mix, hereunder).

Characterization Methods:

Determination of Solid Content of Polymer (PAI-1) Solution

Approximately 0.5 g of the polymer (PAI) solution were precisely weighted in a pre-weighted aluminum weighting pan and placed in drying oven at 250° C. for 15 minutes. The sample weight was than recorded again after room temperature cooling in order to determine the percent solids of polymer resin used using the formula:

% solid={[(dry sample & pan wt)−(pan wt)]/(original sample wt)}×100

Determination of Polymer (PAEK) Particle Size

The particle size distribution was characterized by laser light scattering on dry sample, according to ISO 13320.

Thickness Measurement of the Coating

To evaluate the thickness of the coating, an electronic micrometer with a 0.001 mm tolerance was used. On a 2 meter long non sintered coated tape, the average thickness value was calculated by measuring the thickness in the middle of the tape, every 400 mm, for 6 times.

Liquid Coating Application

Unless differently specified, water-borne polymer compositions were applied on carbon steel panel substrates by conventional air spray technique. The wet film was firstly dried in oven at 150° C. in order to eliminate the excess of water and then baked at 390° C. to obtain film formation.

Adhesion Properties Determination

Adhesion of films formed on substrates was assessed via Cross-Cut Test perNACE TMO185-06.

TABLE 4

| Ingredients | Ex. 1 | Ex. 2 | Ex. 3C |
|---|---|---|---|
| PEEK-1 (wt parts) | 35 | 35 | — |
| PEEK-2 (wt parts) | — | — | 35 |
| PAI-1 (wt parts) | 4.24 | 2.12 | 4.24 |
| Solvents Mix (wt parts) | 9.71 | 9.71 | 9.71 |
| Anti-Foam (wt parts) | 0.50 | 0.50 | 0.50 |
| Surfactant (wt parts) | 2.50 | 2.50 | 2.50 |
| Thixotropic (wt parts) | 1.5 | 1.5 | 1.5 |
| N-butyl-diethanol-amine (wt parts) | 3 | 1.5 | 3 |
| Water (wt parts) | 43.56 | 47.18 | 43.56 |
| Stability[*] | good | good | poor |
| Liquid Viscosity[#] (mPa × s) | 4715 | 1339 | n.d.[○] |
| Adhesion | Good | Good | n.d.[○] |

[*]Stability against sedimentation has been determined monitoring sedimentation of formulations kept at room temperature with no stirring during at least 72 hours; "good" rating was applied when no visible sedimentation was detected; "poor" rating corresponded to formulation showing substantial sedimentation of polymer particles.
[#]liquid viscosity measured at 22° C., using a Brookfield viscometer operating at 10 rpm.
[○]lack of stability against sedimentation rendered measurement of liquid viscosity and processing via coating impossible.

The invention claimed is:

1. A water-borne polymer composition, comprising:
    particles of at least one polyaryletherketone polymer [polymer (PAEK)], said particles possessing an average particle size $d_{50}$ of at least 1 and of at most 25 μm wherein $d_{50}$ is the size at which 50% in volume of the polymer (PAEK) is comprised of particles with a diameter less than this value and is determined by laser light scattering according to ISO 13320;
    at least one aromatic polyamic acid comprising recurring units, more than 50% mol of said recurring units comprising at least one aromatic ring and at least one amic acid group and/or imide group [recurring units ($R_{PAI}$)], more than 50% mol of recurring units ($R_{PAI}$) comprising at least one amic acid group [polymer (PAI)], wherein part or all of the amic acid groups are neutralized by at least one basic compound (B);
    water;
    at least one organic solvent (S), different from said basic compound (B), selected from the group consisting of mono-alcohols, polyols, glycol derivatives and their mixtures, said solvent (S) being present in an amount of at least 1 and at most 15% wt with respect to the total weight of the composition.

2. The water-borne polymer composition of claim 1, wherein said polymer (PAEK) is a polymer comprising more than 50% moles of recurring units ($R_{PAEK}$) selected from the group consisting of units of formulae (K-A) to (K-O) below, and mixtures of two or more than two of the same:

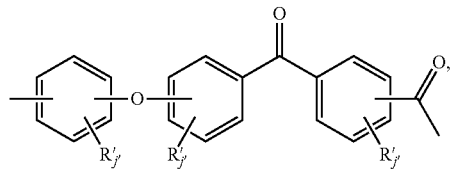
(K-A)

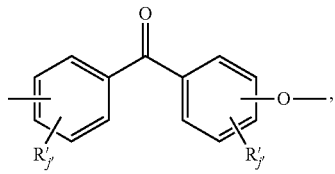
(K-B)

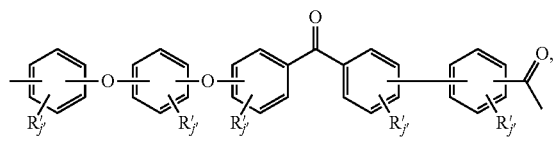
(K-C)

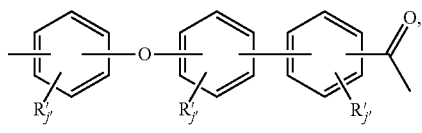
(K-D)

-continued
(K-E)
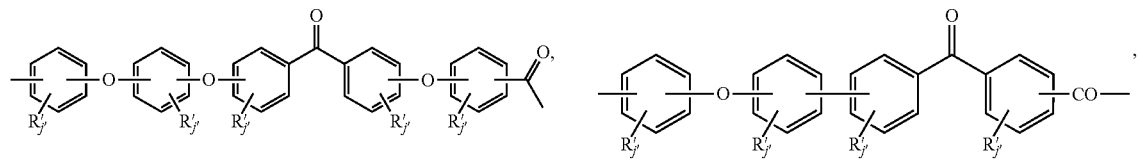
(K-F)
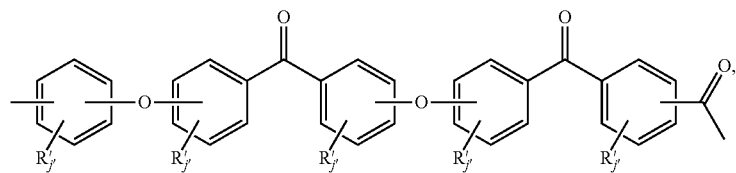
(K-G)
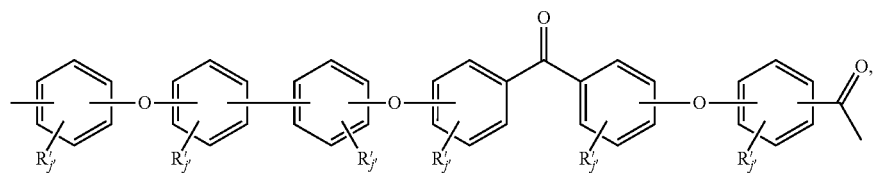
(K-H)
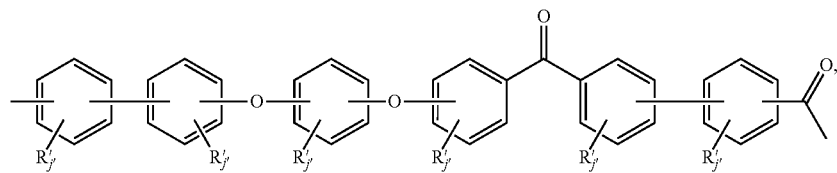
(K-I)
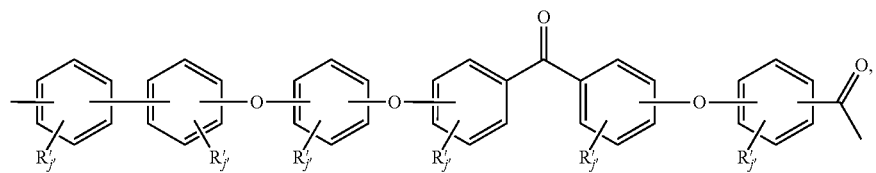
(K-J)
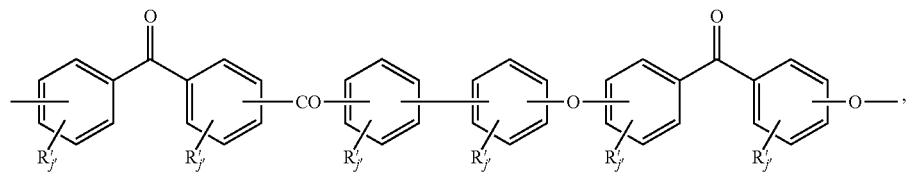
(K-K)
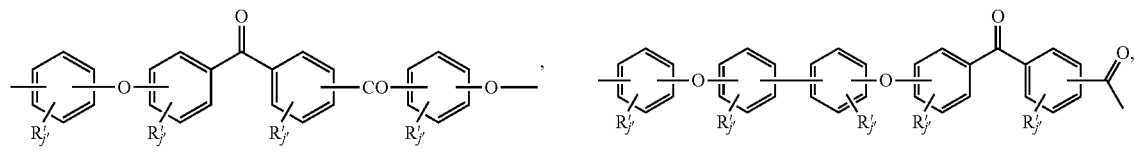
(K-L) (K-M)
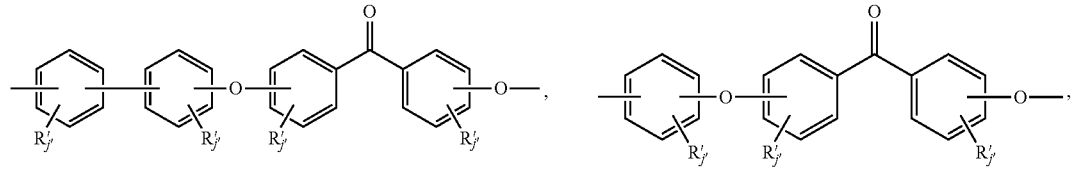
(K-N) (K-O)

wherein in each of formulae (K-A) to (K-O) above, each of R', equal to or different from each other, is independently selected at each occurrence from a $C_1$-$C_{12}$ group optionally comprising one or more than one heteroatoms; sulfonic acid and sulfonate groups; phosphonic acid and phosphonate groups; amine and quaternary ammonium groups; and each of j', equal to or different from each other, is independently selected at each occurrence from 0 and an integer of 1 to 4.

3. The water-borne polymer composition according to claim 2, wherein the recurring units ($R_{PAEK}$) are selected from the group consisting of units of formulae (J'-A) to (J'-D):

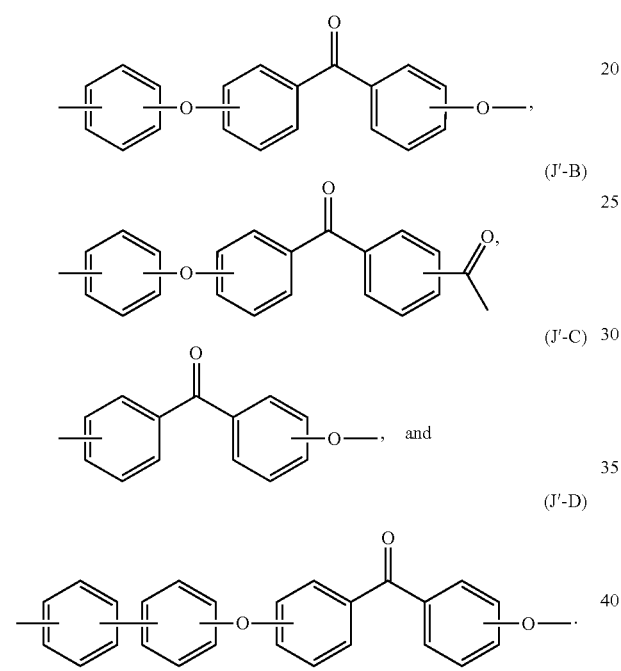

(J'-A)

(J'-B)

(J'-C)

(J'-D)

4. The water-borne polymer composition according to claim 1, which comprises at least 10% wt of polymer (PAEK) with respect to the total weight of the composition and/or which comprises at most 45% wt of polymer (PAEK) with respect to the total weight of the composition.

5. The water-borne polymer composition according to claim 1, wherein said particles of polymer (PAEK) possess an average particle size $d_{50}$ of at least 3 μm and/or of at most 22 μm.

6. The water-borne polymer composition according to claim 1, wherein the recurring units ($R_{PAI}$) are selected from the group consisting of:

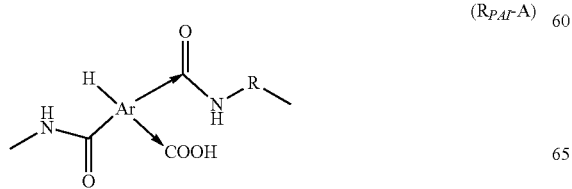

($R_{PAI}$-A)

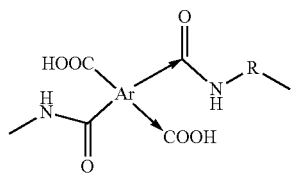

($R_{PAI}$-B)

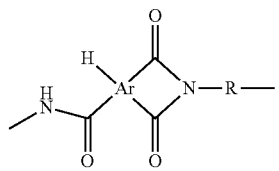

($R_{PAI}$-C)

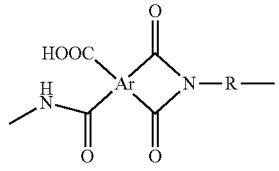

($R_{PAI}$-D)

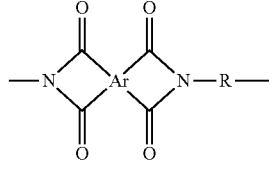

($R_{PAI}$-E)

wherein:
the → denotes isomerism so that in any recurring unit within the aromatic polyamic acid structure the groups to which the arrows point may exist as shown or in an interchanged position, Ar is an aromatic tetravalent group, which optionally comprise one or more than one aromatic ring, and R is an aromatic divalent group, which optionally comprise one or more than one aromatic ring.

7. The water-borne polymer composition according to claim 6, wherein

Ar in the recurring units ($R_{PAI}$) is selected from the group consisting of:

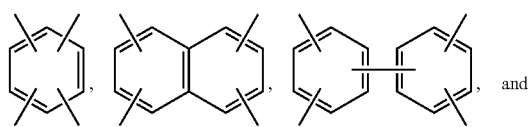

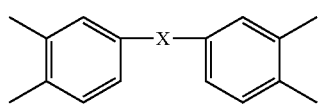

with X being selected from the group consisting of —O—, —C(O)—, —S—, —$SO_2$—, —$CH_2$—, —$C(CF_3)_2$—, and —$(CF_2)_n$— with n=0, 1, 2, 3, 4 or 5.

8. The water-borne polymer composition according to claim 6, wherein

R in the recurring units ($R_{PAI}$) is selected from the group consisting of:

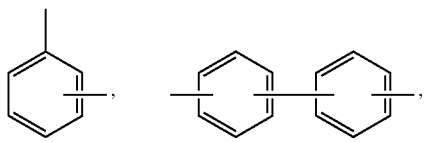

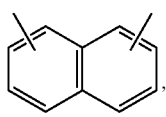

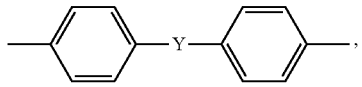

with Y being selected from the group consisting of —O—, —C(O)—, —S—, —SO$_2$—, —CH$_2$—, —C(CF$_3$)$_2$—, and —(CF$_2$)$_n$— with n=0, 1, 2, 3, 4 or 5,

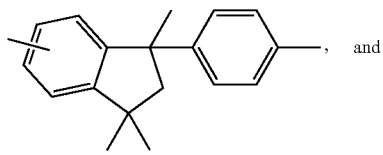 and

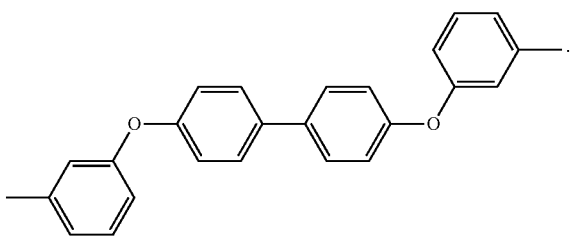

9. The water-borne polymer composition according to claim 6, wherein the recurring units ($R_{PAI}$) are selected from the group consisting of units (i), (ii) and (iii), as below detailed:

(i)

(i-a)

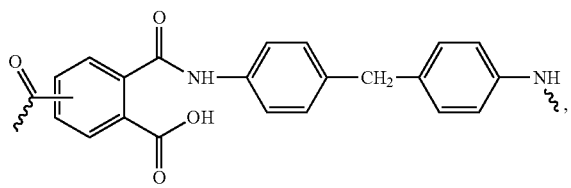

and/or the corresponding imide-group containing recurring unit:

(i-b)

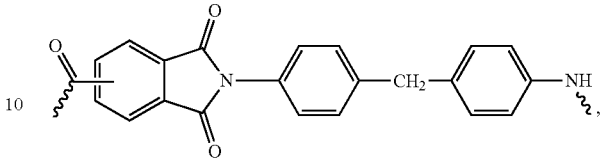

wherein the attachment of the two amide groups to the aromatic ring as shown in (i-a) will be understood to represent the 1,3 and the 1,4 polyamide-amic acid configurations;

(ii)

(ii-a)

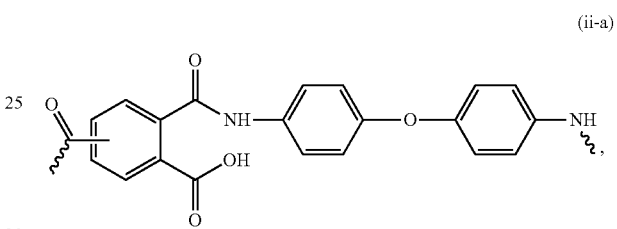

and/or the corresponding imide-group containing recurring unit (ii-b)

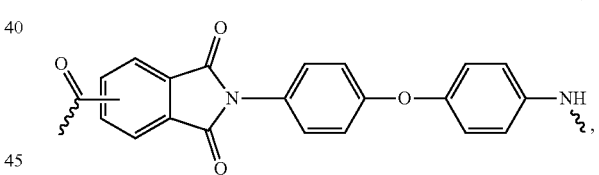

wherein the attachment of the two amide groups to the aromatic ring as shown in (ii-a) will be understood to represent the 1,3 and the 1,4 polyamide-amic acid configurations; and (iii)

(iii-a)

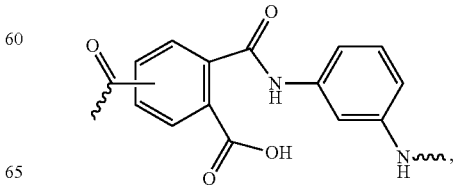

and/or the corresponding imide-group containing recurring unit

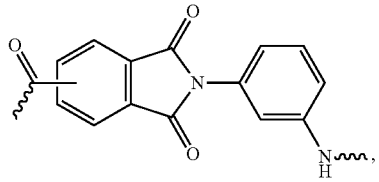
(iii-b)

wherein the attachment of the two amide groups to the aromatic ring as shown in (iii-a) will be understood to represent the 1,3 and the 1,4 polyamide-amic acid configurations.

10. The water-borne polymer composition according to claim 1, wherein the acid number (milligrams of KOH/gram) of the polymer (PAI) is of at least 80, and optionally is up to the theoretical acid number for a resin that comprises only amic acid units.

11. The water-borne polymer composition according to claim 1, comprising at least 0.01% wt of said polymer (PAI) with respect to the total weight of the composition, and/or comprising at most 15% wt of said polymer (PAI) with respect to the total weight of the composition.

12. The water-borne polymer composition according to claim 1, wherein the basic compounds (B) is selected from the group consisting of inorganic and organic bases, wherein
the inorganic bases are selected from the group consisting of alkaline and alkaline-earth metal hydroxides; and
the organic bases are selected from the group consisting of trimethylamine, N,N-dimethylethylamine, N,N-dimethylpropylamine, triethylamine, tributylamine, N,N-dimethylethanolamine, N-butyldiethanolamine diethyl-2-hydroxyethylamine, N,N-dimethylaniline, pyridine, N-methylpyrrole, N,N'-dimethylpiperidine, N,N,N'N'-tetraalkyl-alkaline diamines and poly-N-alkylated alkalene triamines.

13. The water-borne polymer composition according to claim 1, wherein the amount of water, while complementing necessarily the other ingredients in the composition, is at least 30% wt with respect to the total weight of the composition.

14. The water-borne polymer composition according to claim 1, wherein
mono-alcohols are selected from the group consisting of isopropanol, methanol, ethanol, butanol and their mixtures;
polyols are selected from the group consisting of ethylene glycol, propylene glycol, and glycerine; and
glycol derivatives are selected from the group consisting of those complying with general formula (I):

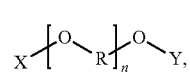
(I)

wherein R is a $C_1$-$C_6$ divalent hydrocarbon group, linear or branched, optionally containing one or more ether bonds; X and Y, equal or different each other, are independently an hydrogen atom, a $C_1$-$C_6$ alkyl group, linear or branched, or a group of formula —C(O)—R', with R' being a $C_1$-$C_6$ alkyl group, linear or branched, with the provision that at least one of X and Y is not an hydrogen atom, and n is an integer between 1 and 3; and those complying with formula (II) here below:

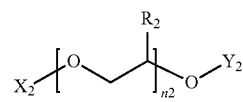
(II)

wherein $R_2$ is an hydrogen atom or a methyl group; $X_2$ and $Y_2$, equal or different each other, are independently an hydrogen atom, a —R" group or a —C(O)—R" group, with R" being a $C_1$-$C_4$ alkyl group, with the provision that at least one of $X_2$ and $Y_2$ is not an hydrogen atom; and n2 is an integer between 1 and 3.

15. A process for manufacturing the water-borne polymer composition according to claim 1, said process comprising dispersing the polymer (PAEK) into the aqueous solution of the neutralized polymer (PAI).

16. A method of coating a substrate possessing at least one surface, said method comprising:
applying on at least a part of said surface the water-borne polymer composition, according to claim 1, so as to obtain a wet layer on said surface; and
drying and backing the said wet layer so as to obtain a coating layer on said surface.

17. The method of claim 16, wherein the water-borne polymer composition is applied as primer or coating by spraying, brushing, roller-coating, dipping or by electrodeposition.

18. An article comprising the water-borne polymer composition according to claim 1.

19. A multilayer structure comprising at least one layer comprising the water-borne polymer composition according to claim 1.

* * * * *